US005708555A

United States Patent [19]

Woodworth et al.

[11] Patent Number: 5,708,555

[45] Date of Patent: *Jan. 13, 1998

[54] SURGE ARRESTER HAVING CONTROLLED MULTIPLE CURRENT PATHS

[75] Inventors: Jonathan J. Woodworth, Portville; Jeffrey Joseph Kester, Olean; Thomas Carl Hartman, Allegany, all of N.Y.

[73] Assignee: Cooper Industries, Inc., Houston, Tex.

[ * ] Notice: The term of this patent shall not extend beyond the expiration date of Pat. No. 5,594,613.

[21] Appl. No.: 659,151

[22] Filed: Jun. 5, 1996

Related U.S. Application Data

[63] Continuation of Ser. No. 376,077, Jan. 2, 1995, Pat. No. 5,594,613, which is a continuation of Ser. No. 958,969, Oct. 9, 1992, abandoned.

[51] Int. Cl.[6] .................... H02H 1/00

[52] U.S. Cl. .................... 361/127; 361/117; 361/126; 361/128

[58] Field of Search .................... 361/117–120, 126–128, 361/129–130; 338/21; 337/28; 313/231.21

[56] References Cited

U.S. PATENT DOCUMENTS

| | | | |
|---|---|---|---|
| 2,883,573 | 4/1959 | Pittman | 361/117 |
| 4,317,155 | 2/1982 | Harada et al. | 361/120 |

*Primary Examiner*—Jeffrey A. Gaffin
*Assistant Examiner*—Sally C. Medley
*Attorney, Agent, or Firm*—Conley, Rose & Tayon, P.C.

[57] ABSTRACT

An improved surge arrester includes metal oxide varistors in series with spark gap assemblies arranged such that the MOV elements conduct the low magnitude, steady-state current through the arrester along a path that is separate and distinct from the path through which impulse current is conducted during an overvoltage.

15 Claims, 5 Drawing Sheets

SURGE ARRESTER HAVING CONTROLLED MULTIPLE CURRENT PATHS

This is a continuation of application Ser. No. 08/376,077 filed on Jan. 2, 1995, patent No. 5,594,613 which is a file wrapper continuation of Ser. No. 07/958,969 filed on Oct. 9, 1992, now abandoned.

BACKGROUND OF THE INVENTION

The present invention relates generally to surge arresters. More particularly, the invention relates to a new design for the internal components of surge arresters. Still more particularly, the invention relates to a new combination of metal oxide varistors (MOV's) and spark gap assemblies in which the MOV elements conduct low magnitude, steady-state current through the MOV along a first current path, and conduct the higher magnitude impulse or surge currents through the MOV along a separate and distinct path.

Under normal operating conditions, electrical transmission and distribution equipment is subject to voltages within a fairly narrow range. Due to lightning strikes, switching surges or other system disturbances, portions of the electric system may experience momentary or transient voltage levels that greatly exceed the levels experienced by the equipment during normal operating conditions. Left unprotected, critic&l and costly equipment such as transformers, switching apparatus, and electrical machinery may be damaged or destroyed by such overvoltages and the resultant current surges. Accordingly, it is routine practice within the electrical industry to protect such apparatus from dangerous overvoltages through the use of surge arresters.

A surge arrester is commonly connected in parallel with a comparatively expensive piece of electrical equipment so as to shunt or divert the overvoltage-induced current surges safely around the equipment, thereby protecting the equipment and its internal circuitry from damage. When caused to operate, a surge arrester forms a current path to ground having a very low impedance relative to the impedance of the equipment that it is protecting. In this way, current surges which would otherwise be conducted through the equipment are instead diverted through the arrester to ground. Once the transient condition has passed, the arrester must operate to open the recently-formed current path to ground and again isolate or "reseal" the distribution or transmission circuit in order to prevent the nontransient current of the system frequency from "following" the surge current to ground, such system frequency current being known as "power follow current." If the arrester did not have this ability to interrupt the flow of power follow current, the arrester would operate as a short circuit to ground, forcing protective relays and circuit breaker devices to open or isolate the now-shorted circuit from the electrical distribution system, thus causing inconvenient and costly outages.

Conventional surge arresters typically include an elongated enclosure or housing made of an electrically insulating material, a stack of voltage-dependent, nonlinear resistive elements retained within the enclosure, and a pair of electrical terminals at opposite ends of the enclosure for connecting the arrester between a line-potential conductor and ground. The nonlinear resistive elements are chosen to have a higher resistance at the normal steady-state voltage and a much lower resistance when the arrester is subjected to high magnitude transient overvoltages. Depending on the type of arrester, it may also include one or more spark gap assemblies housed within the insulative enclosure and electrically connected in series with the nonlinear resistive elements.

Present-day surge arresters are typically one of two basic types and are generally classified according to the type of nonlinear resistive elements they contain. The first type of conventional arrester is commonly referred to as the series gapped silicon carbide (SIC) arrester. The nonlinear resistive elements in this arrester are relatively short cylindrical blocks of silicon carbide which are stacked one atop the other within the arrester housing in series with spark gap assemblies which are generally resistance graded gap assemblies. A resistance graded gap assembly comprises a resistor electrically in parallel with the spark gap and usually includes one or more resistors in series with the gap. This network of resistors is employed to control the voltage level at which the spark gap will begin to conduct. The second type of arrester commonly used today is know as the gapless metal-oxide varistor (MOV) arrester. In this type of arrester, the nonlinear resistive elements comprise disks formed of a metal oxide compound which are again stacked within the arrester housing in series.

In both types of prior art arresters, the voltage-current relationship for the nonlinear elements is expressed as $I=kE^n$, where I is arrester current, k is a constant, E is the arrester voltage, and n is the nonlinear exponent or coefficient. The older series gapped SiC arrester uses low exponent silicon carbide blocks in series with low exponent nonlinear graded gaps, the exponent n of both elements being less than 10 and typically being within the range of 4 to 5 at the operating or steady state voltage. The more modern MOV arrester typically uses only high exponent nonlinear elements of the metal-oxide variety and, as described below, does not require series gap assemblies to operate properly as is the case of SiC arresters. In the case of MOV arresters, the exponent n is usually greater than 10 and typically about 20 or greater at the steady-state system voltage.

Because of the different degrees of nonlinearity of the resistive elements employed in silicon carbide and MOV arresters, these arresters differ in structure and operation. The silicon carbide blocks are designed to provide a very low resistance to surge currents, but a higher resistance to the 60 hertz power-follow current which continues to flow through the arrester after the transient condition has passed. Despite the higher resistance, the silicon carbide blocks will still conduct large currents at the normal, steady-state line-to-ground voltage. Accordingly, gap assemblies are employed in series with the silicon carbide blocks. As a transient overvoltage condition ceases, the resistance of the silicon carbide blocks increases so as to limit the magnitude of the power follow current. The reduced current flow and the corresponding decrease in the voltage across the spark gaps provide the gap assemblies the opportunities to open the current path to ground and thus "reseal" the power circuit after the surge has passed. This type arrester has been in use for many years and is described in many earlier patents, such as U.S. Pat. Nos. 4,161,763 and 4,174,530.

With an MOV arrester, the MOV elements provide either a high or a low impedance current path between the arrester terminals depending on the voltage appearing across the varistor elements themselves. More specifically, at the power system's steady-state or normal operating voltage, the varistors have a relatively high impedance. As the applied voltage is increased, gradually or abruptly, the varistors' impedance progressively decreases. When the voltage appearing across each varistor reaches the elements' breakdown voltage, the varistor impedance dramatically decreases, and the varistors become highly conductive. Accordingly, if the arrester is subjected to an abnormally high transient overvoltage, such as may result from a lightning strike, for example, the varistor elements become highly conductive and serve to conduct the resulting transient current to ground. As the transient overvoltage and resultant current dissipate, the varistor elements' impedance once again increases to a very high value, thereby reducing the current through the MOV arrester to a negligible flow and restoring the arrester and electrical system to their normal, steady-state condition. A variety of MOV arresters have been described in many earlier patents, such as U.S. Pat. Nos. 4,930,039 and 4,240,124.

The series gapped SiC arresters suffer from a variety of undesirable traits. First, because the SiC elements are highly conductive at normal operating voltages, the gap assemblies are required to support the full system line-to-ground voltage over the life of the arrester, the SiC elements being used only to limit current which, in turn, assists the gaps in returning to their non-conductive mode during a discharge operation as described above. Because the gap assemblies must support the full line-to-ground voltage, SiC arresters are typically comprised of many such assemblies, each of which must withstand its proportionate share of the voltage. This type of construction results in more consistent impulse or spark-over characteristics than can be achieved through the use of MOV arresters; however, the undesirable result is that the design yields higher than desired impulse protective characteristics.

Another deficiency characteristic of the series gapped SiC arrester is that its high current discharge characteristic and the power follow current levels are both controlled by the same nonlinear elements, i.e., the SiC elements. To achieve lower high current discharge voltages, it is desirable to have silicon carbide elements with a low resistance. Yet, to provide lower levels of power-follow current, it is desirable to have silicon carbide elements with a high resistance. Due to these diametrically opposed requirements of the same components, design compromises have resulted in less than desirable protective characteristics. Still another inherent problem with the series gapped SiC arrester is its comparatively large size and weight.

The MOV arrester was developed to eliminate the undesirable impulse characteristic of the series gapped silicon carbide arrester. In the MOV arrester, the nonlinear MOV elements eliminate the need for a series gap by remaining highly non-conductive at normal, steady state system voltages. As the voltage applied to the arrester is increased, the MOV element, which is a semiconductor, gradually begins to conduct, without a disruptive discharge as is characteristic with the series gapped SiC arrester. This switch-like characteristic enables the MOV arrester to shunt all fundamental transient overvoltage energies to ground. The inherent problem with this type of arrester, however, is that both the turn-on or breakdown voltage and the high current discharge voltage are controlled or dictated by the same nonlinear elements. It is desirable for the arrester to have higher breakdown voltages so that transient overvoltages having a lower, nondestructive magnitude do not result in conduction through the MOV elements. At the same time, it is also desirable for the arrester to have lower high current discharge voltages to provide better equipment protection. Again, as with the series gapped SiC arrester, two diametrically opposed requirements of the same component result in a compromise of characteristics. In some cases the discharge voltage capability of the MOV arrester is compromised. In other instances, the arrester's ability to withstand a temporary, relatively low overvoltage condition, defined as the arrester's temporary overvoltage capability, is reduced.

More recently, a hybrid arrester has been developed which combines the gap assemblies previously used in the silicon carbide gapped arresters with the MOV elements of the metal oxide varistor arrester. Such hybrid arrester is described in co-pending U.S. patent application, Ser. No. 07/420,069, and in the publication entitled *New Surge Arrester Technology Offers Substantial Improvement in Protection and Reliability* as presented to the SEE Overhead Committee, Annapolis, Md., May 10, 1990, such written disclosures being incorporated herein by reference. The hybrid arrester has been shown to have superior performance characteristics as compared to both the SiC gapped arresters and the MOV arresters.

Despite the advances made by the hybrid arrester, further technological advances would be welcomed by the industry. Specifically, the resistance graded gap structures used in the silicon carbide gapped arrester and in the hybrid arrester must be precisely matched. Further, assembly of the complicated gap structures in the arrester is tedious and thus costly. An arrester having similar or improved characteristics as compared to the hybrid arrester, but without the disadvantages associated with the resistance graded gap structures would be a welcomed addition to the art. It would further be desirable to decrease the volume of expensive MOV material currently required in the MOV and hybrid arresters.

SUMMARY OF THE INVENTION

Accordingly, there is provided a surge arrester structured to have improved performance characteristics, as compared to conventional MOV and series gapped silicon carbide arresters, and to have fewer and less complicated internal components which require less materials and time to manufacture. The arrester of the present invention includes a resistive element, which in the preferred embodiment comprises a metal oxide varistor, having a steady-state current path and a separately defined impulse current path. The resistive element includes a central core portion surrounded by an outer portion. The core portion comprises the impulse current path which is formed parallel to and along the longitudinal axis of the arrester. The steady-state current path may be formed at an angle relative to the longitudinal axis, or may, alternatively, be formed coaxially with the impulse current path through the outer portion of the resistive element.

The arrester may further include any of a variety of conductive contact surfaces formed on the faces of the resistive element and provided both to create a more uniform current density for impulse current and to provide additional resistance to steady-state current flow in order to direct the steady-state current to flow in the desired steady-state path. The contact surface may comprise an annular contact, formed about the periphery of the face of the resistive element, and a central circular contact formed within the annular contact. Alternatively, the contact surface may comprise a series of concentric rings formed on the face of the resistive element or may comprise an array of spot contacts. To further increase the resistance to steady-state current flow in a path other than the desired path, grooves, channels or notches may be formed in the faces of the resistive element.

The invention further includes a simplified spark gap assembly which directs the steady-state current to flow in a path that is coaxial to the impulse current path and which also simplifies the construction of the spark gap assembly. In one embodiment of the invention, the arrester includes a conductive ring disposed between two adjacent varistors at unmetalized surfaces on the periphery of the varistors, the unmetalized surfaces creating an additional resistance to the flow of steady-state current. The invention may alternatively include a varistor having a base portion and a crown portion formed on the upper surface of the base whereby the crown portion physically supports the adjacent varistor and provides the additional resistance that is desirable in the steady-state current path. In this embodiment, the spark gap is formed between the opposing faces of the adjacent varistors. The arrester may also include an electrode disposed between the crown of one varistor and the base of the adjacent varistor, the spark gap being formed between the central portion of the electrode and the adjacent face of the varistor. To increase the resistance in the coaxial steady-state current path, the invention may include a crown portion formulated from a material having electrical characteristics which differ from the material forming the base portion of the varistor. Alternatively, or to create still additional resistance in the steady-state current path, a semi-conductive coating may be applied between the crown of the resistive element and the electrode or between the crown and the adjacent varistor being supported by the crown.

The invention also includes an arrester having voltage dependent, nonlinear resistive material disposed about a central substrate core, the resistive material including a channel spirally formed through the material creating spark gaps across the channel between adjacent portions of the resistive material. In this embodiment, the arrester includes a current path for the steady-state current which is spirally directed about the longitudinal axis of the arrester, and a more direct path for the impulse current which is directed through the arrester across the spark gaps in a multitude of paths which are parallel to the longitudinal axis of the arrester.

Thus, the present invention comprises a combination of features and advantages which enable it to substantially advance arrester technology by providing a surge arrester having resistive elements and separately defined current paths within the resistive elements for the steady-state and impulse currents. Controlling the current paths through the arrester in this manner simplifies and reduces the cost of manufacturing of the arrester and provides improved performance characteristics as compared to conventional MOV and series gapped SiC arresters. For example, the arrester of the present invention will have a temporary overvoltage capability equal to twice the maximum continuous overvoltage rating of the arrester and will have discharge voltages that are significantly lower than similarly rated conventional MOV and SiC arresters. Further, the arrester made in accordance with the invention may be smaller and lighter than conventional MOV arresters since the MOV elements may be shorter in height than those required in conventional gapless MOV arresters. These and various other characteristics and advantages of the present invention will be readily apparent to those skilled in the art upon reading the following detailed description and referring to the accompanying drawings.

BRIEF DESCRIPTION OF THE DRAWINGS

For an introduction to the detailed description of the preferred embodiment of the invention, reference will now be made to the accompanying drawings, wherein.

DESCRIPTION OF PREFERRED EMBODIMENT

Surge arresters are installed in electrical systems for the purpose of diverting dangerous overvoltage-induced surges to ground and preventing such surges from damaging costly or critical electrical equipment. The present invention relates in general to any type of electrical apparatus which may be protected by surge arresters, such apparatus including transformers and electrical switching devices. For example, the arrester and arrester subassemblies of the present invention may be employed in low voltage, distribution class and station class arrester applications.

Figure 1:
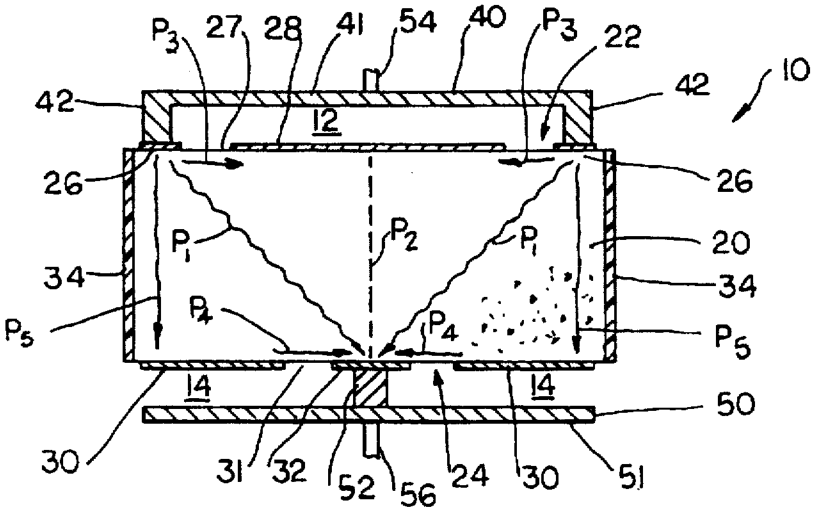
FIG. 1 shows a cross-sectional view of a surge arrester subassembly structured in accordance with the present invention.

Referring to FIG. 1, there is shown a cross-sectional view of an arrester subassembly 10 structured in accordance with the present invention. As shown, subassembly 10 generally comprises a nonlinear metal oxide varistor (MOV) 20 and upper and lower electrodes 40 and 50, respectively. MOV 20 is made of metal oxide and preferably is formed into a short cylindrical disk having an upper face 22 and a lower face 24. Disposed circumferentially about the outer surface of MOV disk 20 is a dielectric collar or sleeve 34 preferably made of epoxy. MOV 20 must be capable of withstanding high energy surge currents. The metal oxide for MOV 20 may be of the same material used for any high energy, high voltage MOV disk, and is preferably made of a formulation of zinc oxide. See, for example, U.S. Pat. No. 3,778,743 of the Matsushita Electric Industrial Co. Ltd., Osaka, Japan, incorporated herein by reference. In the preferred embodiment, MOV 20 will have a uniform microstructure throughout the MOV disk and the exponent n for the zinc oxide formulation of MOV 20 will be in the range of about 10–25 at the steady state system voltage. An exponent n of approximately 20 is most preferred.

MOV 20 must be capable of discharging the high energy surge currents caused by lightning strikes and then thermally recovering so as to be capable of enduring repetitive high surge currents. It is desirable for MOV 20 to be able to thermally recover from a high energy surge current while it is energized at the power system's maximum continuous operating voltage (MCOV). MOV 20 of the present invention is capable of conducting lightning surge currents of up to 100,000 amps. MOV 20 will recover from a 100,000 amp surge current of a short duration such as a 4/10 wave (four microseconds to crest and decaying to half crest in 10 microseconds). The cross-sectional area of MOV 20 will partially dictate its durability and recoverability from high surge currents. It is preferred that the circular cross-section of MOV 20 have a diameter between approximately 1 to 3 inches to insure that there is sufficient surface area of between about 0.785 and 7.07 square inches to maintain the desired durability and recoverability. At the same time, it is also desirable that MOV 20 have as small a cross-sectional area as possible in order to reduce the size, weight and cost of the arrester. As size is reduced, however, the durability and recoverability of the disk is decreased. Given these considerations, a diameter of approximately 2 inches is the most preferred. The thickness of MOV 20 as measured between faces 22 and 24 is preferably about 0.75 inches. As understood by those skilled in the art, given a particular metal oxide formulation and a uniform or consistent microstructure throughout the MOV disk, the thickness of the MOV disk determines the operating voltage level.

Referring still to FIG. 1, MOV 20 also includes metalized contact surfaces 26 and 28 formed on upper face 22 and metalized contact surfaces 30 and 32 formed on its lower face 24. In the preferred embodiment, contact surfaces 26, 28, 30 and 32 are sprayed-on metalized coatings of molten aluminum having a thickness approximately equal to 0.002 to 0.010 inches. As shown in FIG. 1, contact surface 26 is an annular contact formed along the periphery of upper face 22 of MOV disk 20. Contact surface 28 is centrally disposed on the upper face 22 of MOV disk 20 concentrically within contact surface 26. An unmetalized portion 27 is thus formed between contact surfaces 26 and 28 on upper face 22. Contact surface 30 comprises an annular contact formed on lower face 24 of MOV disk 20. Contact surface 32 is located in substantially the center of lower face 24 and concentrically within annular contact surface 30. An unmetalized portion 31 is thereby formed between contact surfaces 30 and 32 on lower face 24. It is preferable that unmetalized portions 27 and 31 have a width approximately equal to 0.1875 inches.

Electrodes 40 and 50 are preferably formed of brass, although copper, aluminum, tin-plated steel or other electrically-conducting material may be employed. Upper electrode 40 comprises a circular plate 41 having a raised rim or lip 42 disposed about its periphery, lip 42 being positioned in electrical contact with contact surface 26 of MOV disk 20. Lower electrode 50 includes a circular plate 51 having a centrally located contact 52 which is in electrical contact with contact surface 32 of MOV disk 20. Upper and lower conductors 54 and 56 are electrically connected to contacts 40 and 50, respectively, and are employed to connect the arrester subassembly 10 to a voltage source.

Referring still to FIG. 1, arrester subassembly 10 further includes a first spark gap 12 which is formed between electrode 40 and contact surface 28 at the upper face 22 of MOV disk 20. Similarly, a second spark gap 14 is formed between electrode 50 and annular contact surface 30 at the lower face 24 of MOV disk 20. In the preferred embodiment, spark gaps 12 and 14 are within the range of approximately 0.01–0.10 inches. As explained more fully below, this structure of arrester subassembly 10 creates separate and distinct controlled current paths through MOV 20, such paths being represented by arrows $P_1$ and $P_2$ as shown in FIG. 1. As shown, arrow $P_1$ represents a controlled current path from contact surface 26 on the outer periphery of upper face 22 to the lower central contact surface 32 on lower face 24. Although only two such paths $P_1$ are shown in FIG. 1, it should be understood that a multitude of similar current paths are created between the annular contact surface 26 to lower central contact surface 32. A second controlled current path represented by arrow $P_2$ is formed substantially parallel to the longitudinal axis of MOV disk 20 and substantially perpendicular to upper and lower faces 22 and 24. Again, although only a single arrow $P_2$ is shown, a multitude of parallel paths $P_2$ exist through substantially the entire cross section of MOV 20 from upper face 22 to lower face 24. The paths shown by arrows $P_3$, $P_4$ and $P_5$ in FIG. 1 represent some of the myriad of other potential current paths between metalized contact surfaces 26, 28, 30 and 32.

Figure 2:
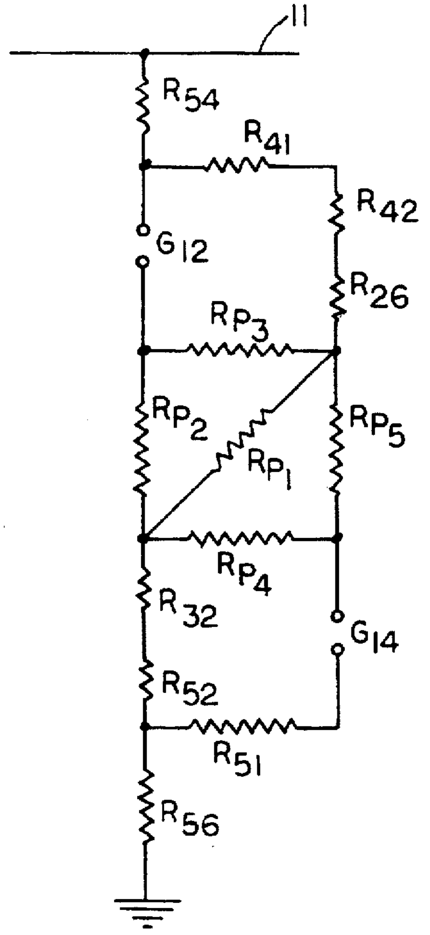
FIG. 2 shows a schematic diagram of the arrester subassembly shown in FIG. 1.

Referring briefly to FIG. 2, there is shown a simplified schematic diagram of the arrester subassembly 10 shown in FIG. 1 connected to line-potential conductor 11. The resistances $R_{P1}$, $R_{P2}$, $R_{P3}$, $R_{P4}$, and $R_{P5}$ shown in FIG. 2 represent the impedance of paths $P_1$, $P_2$, $P_3$, $P_4$ and $P_5$ respectively, as shown in FIG. 1. $R_{26}$ and $R_{32}$ represent the impedance formed by contact surfaces 26 and 32, respectively. For simplicity, the impedances of contact surfaces 28 and 30 (both to current flow in a direction perpendicular to and parallel to upper and lower faces 22, 24) have not been shown in the schematic diagram. Likewise, spark gaps which exist across unmetalized surface 27 (between contact surfaces 26 and 28) and unmetalized surface 31 (between contact surface 30 and 32) are not shown in FIG. 2. $G_{12}$ and $G_{14}$ represent gaps 12 and 14 respectively. The impedances of conductors 54, 56, plates 41, 51, electrode lip 42 and electrode contact 52 are each represented by an "R" with a subscript having the corresponding reference numeral.

The operation of arrester subassembly 10 will now be described with reference to FIGS. 1 and 2. During steady-state operation, when no transient overvoltage is present on the electrical system to which subassembly 10 is connected, the resistance of MOV disk 20 is relatively high such that the system line-to-ground voltage is shared by MOV 20 and by gaps 12 and 14. In this instance, the voltages across gaps 12 and 14 are not of a magnitude high enough to cause the gaps to conduct. Accordingly, the steady-state current at the system frequency (typically 60 hertz in the United States) flows through arrester subassembly 10 along the path formed by upper electrode 40, contact surface 26, diagonal path $P_1$ and finally to ground via contact surface 32 and electrode 50. Under impulse or surge conditions, the resistance of MOV disk 20 will decrease dramatically. As this occurs, more and more of the voltage that is applied to subassembly 10 appears across the series of resistances which are in parallel with gaps 12 and 14. More specifically, as the applied voltage increases, the voltage across gaps 12 increases due to the resistances $R_{26}$, $R_{41}$ and $R_{42}$. Likewise, the voltage across gap 14 will increase as the transient voltage is applied due to the resistances $R_{32}$, $R_{51}$ and $R_{52}$. When the voltage across gaps 12, 14 reaches the gap's spark-over voltage, current will be conducted across the gap. Depending on the magnitude of the transient overvoltage, one or both gaps 12, 14 may sparkover. In instances where both gaps 12, 14 sparkover, the high magnitude surge or impulse current is conducted through arrester subassembly 10 via electrode 40, across gap 12 to upper central contact surface 28, through the entire central or core portion of MOV 20 along path $P_2$ and the many corresponding parallel paths (not shown) to lower peripheral contact surface 30, and across gap 14 to ground through electrode 50. As understood by those skilled in the art, a certain portion of the impulse current conducted through MOV 20 along path $P_2$ will be conducted directly to lower electrode 50 through contact surface 32 and contact 52, rather than across gap 14.

The control of the current through MOV 20 via alternate controlled current paths $P_1$ and $P_2$ is accomplished by controlling the dimensions of contact surfaces 26, 28, 30 and 32 and the dimensions of gaps 12 and 14. Controlling these dimensions dictates the resistance to the current flow which, in turn, causes the current to be conducted primarily through one path or another. Referring to FIGS. 1 and 2, the resistances across gaps 12 and 14 are comparatively very large under steady-state conditions such that gaps 12 and 14 will not conduct. Contact surfaces 26, 28, 30 and 32 are dimensioned such that unmetalized portion 27 on upper face 22 and unmetalized portion 31 on lower face 24 have a high resistance to current conducted along the paths denoted by arrows $P_3$ and $P_4$. Unmetalized portions 27 and 31 ensure that the resistance of path $P_1$ is much less than the sum of resistances $R_{P3}$ plus $R_{P2}$ and much less than the sum of resistances $R_{PR}$ and $R_{P5}$, thus the steady-state current flows through MOV 20 along paths $P_1$. In the impulse or surge conduction mode, gap 12 or gap 14 or both will spark over and begin to conduct, allowing the surge current to be conducted through MOV 20 along the shorter and more direct paths $P_2$.

As understood by those skilled in the art, the "discharge voltage" of an arrester is the voltage appearing across the arrester terminals when the arrester is functioning to dissipate the potentially damaging energy associated with transient overvoltages. The discharge voltage is the product of the transient or impulse current flowing through the arrester multiplied by the resistance of the arrester during the surge, and is the voltage that the equipment being safeguarded by the arrester will see. To provide greater margins of protection for the equipment, it is desirable for arresters to have low discharge voltages. At the same time, it is desirable for arresters to have high temporary overvoltage (TOV) capabilities to allow temporary voltage excursions of system frequency above the nominal system operating voltage. Accordingly, it is desirable for the arrester to "turn on" at voltages as near to the discharge voltage as possible. With conventional MOV and SiC arresters, these two characteristics are achieved such that one of the desirable characteristics must be sacrificed in order to optimize the other. By contrast, the present invention provides greatly improved (lower) discharge voltages than the conventional arresters while, at the same time, maintaining relatively high TOV capabilities. The present invention thus reduces the separation between the "turn on" or "break down" voltage of the arrester and the discharge voltage of the arrester. This is achieved by controlling the path taken by the steady state current and requiring the steady state current to take a path $P_1$ through MOV 20 that is longer than the height of MOV 20 (longer than $P_2$ and $P_5$ shown in FIG. 1). Thus, providing multiple controlled current paths through MOV disks 20 provides improved protective margins (lower discharge voltages) without sacrificing TOV capability as is required with conventional-arresters.

Figure 3:
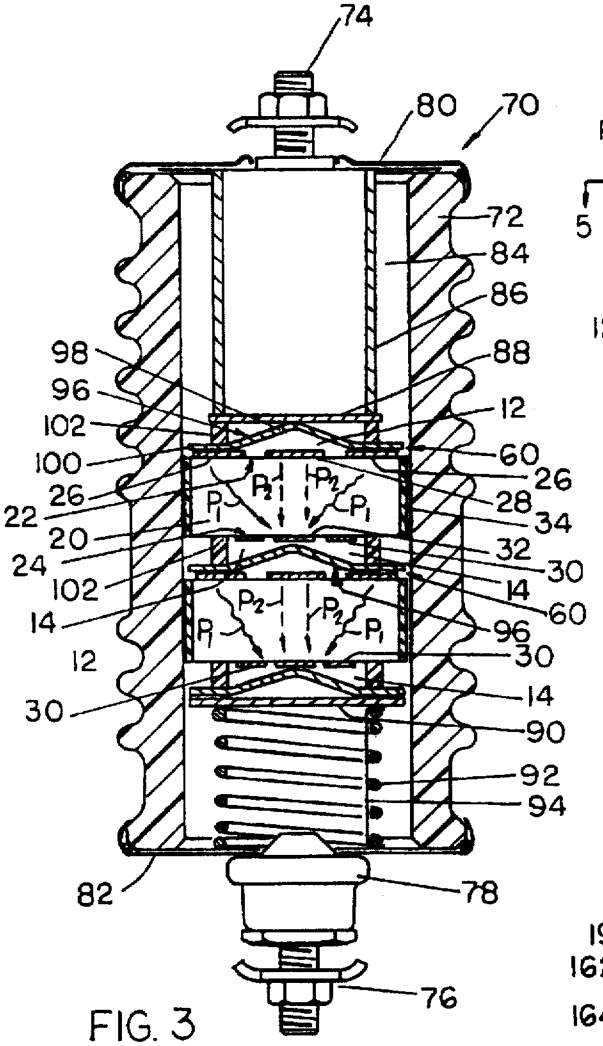
FIG. 3 shows an elevation view, partly in cross-section, of a surge arrester of the present invention.

As also understood by those skilled in the art, a surge arrester typically includes a number of MOV's 20 stacked in series relationship inside an arrester housing, the number of MOV's 20 being dependent upon the formulation of the metal oxides and the doping materials employed in manufacturing the MOV's, the thickness of the MOV elements, and the voltage rating required of the arrester in the given application. Referring to FIG. 3, there is shown a plurality of arrester subassemblies 60 combined in series to form a surge arrester 70 structured in accordance with the present invention.

Arrester 70 generally comprises insulative housing 72, a plurality of arrester subassemblies 60, upper and lower closures 80, 82 and upper and lower terminals 74, 76, respectively. Housing 72 is generally cylindrical in shape and made from an insulative material such as porcelain or a polymer. A central cavity 84 is formed through housing 72 substantially along the longitudinal axis of the housing. Arrester subassemblies 60 are stacked in series relationship within cavity 84 along with conductive spacer 86, conductive plates 88, 90, conductive strap 94 and coil spring 92. Upper and lower closures 80, 82, respectively, are disposed about the ends of housing 72 and hermetically seal the components within cavity 84 from the ambient environment. Closures 80 and 82 are formed of brass, copper or similar conductive material and are electrically connected to terminals 74 and 76 which, in turn, are employed to electrically connect arrester 70 between and voltage source and ground. Conductive spacer 86 engages and makes electrical contact between upper closure 80 and conductive plate 88. Coil spring 92 impacts a compressive force on subassemblies 60, plates 88 and 90, and spacer 86 as is necessary for good electrical contact. Conductive strap 94 completes the electrical path between conductive plate 90 and lower closure 82. An isolator 78 is connected between lower closure 82 and lower terminal 76 and employed to explosively disconnect arrester 70 from the ground connection (not shown) in the event that the arrester fails to reseal after the arrester has operated to divert a surge to ground.

Subassemblies 60 are similar in structure to subassembly previously described with respect to FIGS. 1 and 2. In describing subassembly 60, like reference numerals have been used where the elements correspond to the elements previously described with respect to subassembly 10 in FIG. 1. As shown in FIG. 3, subassembly 60 generally comprises MOV disk 20, an electrode 96 and an insulative ring 102. MOV disk 20 includes upper face 22, lower face 24, upper peripheral contact surface 26, upper central contact surface 28, lower peripheral contact surface 30 and lower central contact surface 32 all as previously described. Electrode 96 comprises a relatively flat base portion 100 formed along its periphery and includes a raised central portion 98. Electrode 96 is preferably comprised of brass, but may also be made from copper, aluminum or other conductive materials. Electrode 96 is disposed on upper face 22 of MOV 20 such that electrode base portion 100 is in electrically contact with peripheral contact surface 26. Upper spark gap 12 is thereby formed between the raised portion 98 of electrode 96 and central contact surface 28 of MOV 20.

As shown in FIG. 3, adjacent subassemblies 60 are separated within housing 72 by insulative rings 102. Insulative rings 102, which are preferably formed of porcelain or insulative polymer, are employed to separate lower face 24 of MOV 20 from electrode 96 of an adjacent subassembly 60. In the preferred embodiment, insulative ring 102 has a height substantially equal to 0.1 inch, which is the distance between base portion 100 and the peak of raised portion 98 of electrode 96. In this configuration, insulative rings 102 define and maintain spark gap 14 which is formed between electrode 96 and contact surface 30 on lower face 24 of MOV 20.

In operation, arrester 70 conducts current through a series path defined by upper terminal 74, closure 80, spacer 86, conductive plate 88, subassemblies 60, conductive plate 90, conductive strap 94, lower closure 82 and lower terminal 76. In the steady-state mode, the voltage will be shared equally by subassemblies 60 and, within each subassembly 60, will be shared by MOV 20 and gaps 12 and 14. The voltage appearing across each subassembly 60 in such steady-state mode will not be of a magnitude great enough to cause spark gaps 12 and 14 to conduct. Accordingly, the steady-state current is conducted through each subassembly 60 along the path defined by electrodes 96, upper peripheral contact surface 26, the internal path denoted by arrow $P_1$ and lower central contact surface 32.

When arrester 70 experiences a transient of a magnitude high enough to cause spark gaps 12 and 14 to conduct, the resulting surge current is conducted through each subassembly 60 along the path formed by spark gap 12, upper central contact surface 28, internal MOV paths $P_2$. The current is then conducted through the next adjacent subassembly 60 via spark gap 14 formed between contact surface 30 and the adjacent electrode 96. In this embodiment too, a certain portion of the surge current conducted through MOV 20 along paths $P_2$ will be conducted directly to electrode 96 through raised central portion 98, rather than across gap 14.

Figure 4:
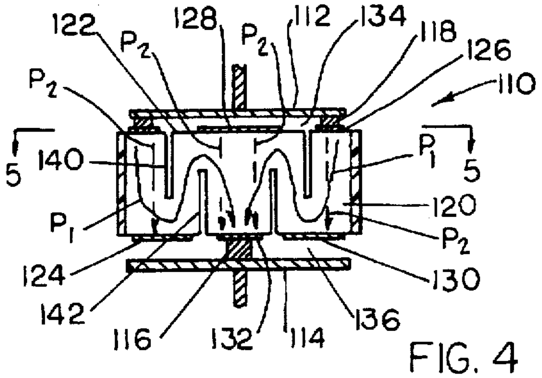
FIG. 4 shows a cross-sectional view of an alternative embodiment of the arrester subassembly of FIG. 1.
Figure 5:
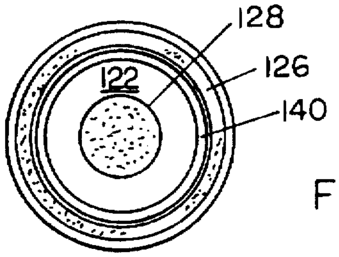
FIG. 5 shows a top plan view of the MOV disk which comprises a portion of the arrester subassembly shown in FIG. 4.

Shown in FIGS. 4 and 5 is an alternative embodiment of an arrester subassembly of the present invention designed to increase the length, and thus the resistance, of the steady-state current path $P_1$ through the MOV material. Referring to FIG. 4, there is shown an arrester subassembly 110 generally comprising MOV 120, upper electrode 112 and lower electrode 114. MOV disk 120 is comprised of zinc oxide or other suitable metal oxide material as previously described with respect to MOV 20 shown in FIGS. 1 and 3. MOV 120 includes upper and lower faces 122, 124, respectively. Formed on upper face 122 are peripheral contact surface 126 and central contact surface 128 best shown in FIG. 5. Lower face 124 includes central contact surface 132 and peripheral contact surface 130. Surfaces 126, 128, 130 and 132 are similar in structure and function as surfaces 26, 28 and 32 previously described with reference to FIG. 1. Grooves 140 and 142 are machined in upper face 122 and lower face 124, respectively, of MOV disk 120. Alternatively, MOV disk 120 may be originally formed and sintered to include grooves 140 and 142. In either event, grooves 140 and 142 penetrate into MOV disk 120 to a depth at least equal to one-half the thickness of MOV 120 and preferably to a depth equal to approximately three fourths of the thickness of MOV 120. As described more fully below, grooves 140 and 142 extend the length, and thus increase the resistance, of steady-state current path $P_1$ through MOV disk 120.

Electrode 112 comprises a circular plate made of conducting material, preferably brass. Disposed between contact 112 and upper face 22 of MOV 120 is a conductive ring 118 made of brass, copper, aluminum or other conductive material. Ring 118 provides a series path for current between electrode 112 and contact surface 126 and, together with electrode 112, comprises an alternative electrode structure to the rimmed electrode 40 previously described with reference to FIG. 1. Lower electrode 114 includes central contact 116 which provides electrical contact with contact surface 132. Electrode 114 is identical to electrode 50 previously described with respect to FIG. 1. Series gap 134 is formed between upper electrode 112 and contact surface 128. Gap 136 is defined by lower electrode 114 and lower peripheral contact 130.

In operation, arrester subassembly 110 functions similarly to the subassembly 10 described with reference to FIG. 1. Referring again to FIG. 4, under normal, non-transient conditions, the steady-state current is conducted through electrode 112 and conductive ring 118 and through MOV disk 120 along path shown by arrows $P_1$, from upper contact surface 26 to lower contact surface 132. Upper and lower grooves 140, 142 provide added resistance and thereby prevents the steady-state current from flowing substantially diagonally from the contact surface 126 directly to lower central contact surface 132 as was permitted in the embodiment of FIG. 1. With the added resistance provided by grooves 140 and 142, the steady-state current is required to take a more circuitous or meandering path as represented by arrow $P_1$ in FIG. 4. To provide even greater resistance than that produced by grooves 140 and 142 alone, grooves 140 and 142 may be filled with an insulative material such as RTV type silicone rubber. When the subassembly 110 experiences an impulse condition, gaps 134 and 136 will begin to conduct permitting the surge current to flow between electrodes 112 and 114 along shortened and more direct paths as represented by arrows $P_2$ in FIG. 4.

Figure 6:
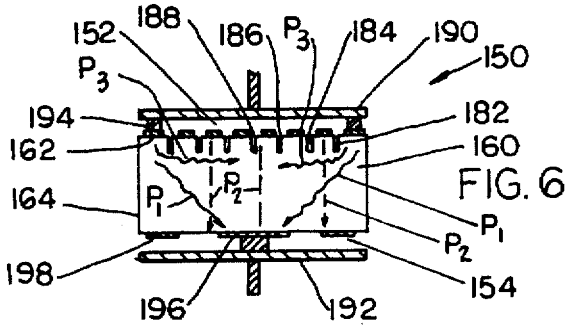
FIG. 6 shows a cross-sectional view of another alternative embodiment of the arrester subassembly of FIG. 1.
Figure 7:
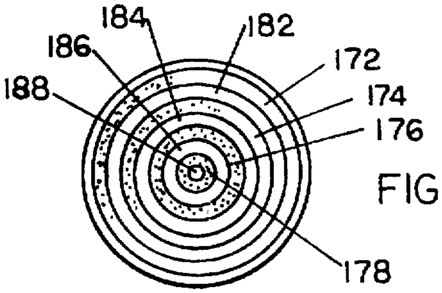
FIG. 7 shows a top plan view of the MOV disk comprising a portion of the arrester subassembly shown in FIG. 6.

FIGS. 6 and 7 show an arrester subassembly 150 having multiple current paths which is an alternative to subassembly 10 shown in FIG. 1. Referring now to FIGS. 6 and 7, subassembly 150 generally comprises MOV disk 160, upper electrode 190, lower electrode 192 and conductive ring 194. Upper and lower electrodes 190, 192 and ring 194 are identical in structure and function as upper electrode 112, lower electrode 114 and conductive ring 118 described with reference to FIG. 4. MOV disk 160 includes upper face 162 and lower face 164. Formed or machined in upper face 162 are concentric grooves 182, 184 and 186. A bore 188 is formed substantially in the center of upper face 162. Bore 188 and grooves 182, 184 and 186 are formed to a depth approximately equal to one-eighth to one-fourth of the total thickness of MOV disk 160. As best shown in FIG. 7, concentric, spaced-apart contact surfaces 172, 174, 176 and 178 are formed on upper face 162 between grooves 182, 184, 186 and bore 188. Lower face 164 includes a central contact surface 196 and peripheral contact surface 198 which are identical in structure and function as contact surfaces 32 and 30, respectively, described previously with reference to FIG. 1. A series spark gap 152 is defined by upper electrode 190 and contact surfaces 172, 174, 176, 178. A series gap 154 is formed between lower peripheral contact surface 198 and lower electrode 192.

Under normal, non-transient conditions, steady-state current flows between electrodes 190 and 192 through conductive ring 194 and through MOV disk 160 along the path denoted by arrows $P_1$. Under surge conditions, current is conducted across gaps 152 and 154 and through MOV 160 along path denoted by arrows $P_2$. To provide for the maximum energy handling capability of MOV 160, it is desirable to conduct surge current between upper face 162 and lower face 164 through the entire cross-sectional area of the MOV 160. If that were the only design consideration, the entire upper face 162 could include a sprayed-on metallic contact surface; however, such a design would permit steady-state current to propagate from conductive ring 194 toward the center of MOV block 160 along the metalized upper face 162 and then along path denoted by arrow $P_2$, rather than along the desired longer, higher resistance path denoted by arrow $P_1$. Accordingly, to prevent such propagation, grooves 182, 184, 186 and bore 188 are provided in upper face 162 to increase the path length and, thus, the resistance of the path denoted by arrow $P_3$ shown in FIG. 6. Because the combined resistance of the path denoted by arrow $P_3$ and $P_2$ is much greater than the resistance in path denoted by arrow $P_1$, steady-state current is conducted along the path shown by arrows $P_1$, while surge current may be conducted through the entire cross-sectional area of MOV 160 along multiple paths denoted by arrows $P_2$.

Figure 8:
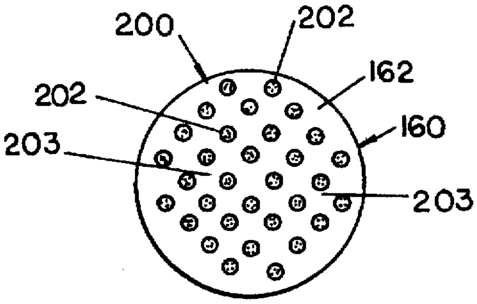
FIG. 8 shows a top plan view of an alternative embodiment for the MOV disks of the arrester subassemblies shown in FIGS. 1–6.

Referring to FIG. 8, there is shown an alternative embodiment for upper face 162 of MOV 160 shown in FIGS. 6 and 7. In this embodiment, an array 200 of spot or point contact surfaces 202 are applied to upper face 162 of MOV 160. Each spot contact surface 202, which is formed by arc spraying or similar metalizing process, is separated from adjacent contacts 202 by a predetermined distance. Providing the array 200 of contacts 202 on the entire upper face of MOV 160 enables substantially the entire cross-sectional area of MOV 160 to be employed in conducting surge current through the MOV. At the same time, the unmetalized or uncoated portions 203 of upper face 162 between each surface contact 202 increases the surface resistance to steady-state current flowing from the periphery to the center of upper face 162. In this way, as described above with reference to FIG. 6, the steady-state current will be conducted through MOV 160 along the diagonal paths noted by arrow $P_1$ in FIG. 6.

Figure 9:
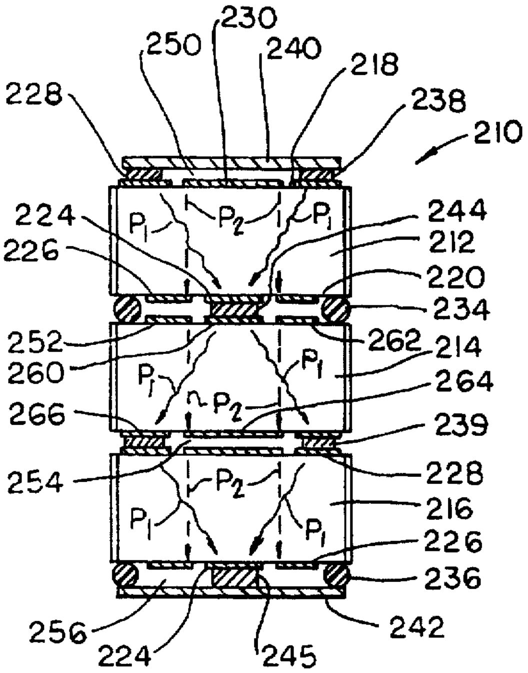
FIGS. 9 and 10 show cross-sections of alternative embodiments of the surge arrester shown in FIG. 3.
Figure 10:
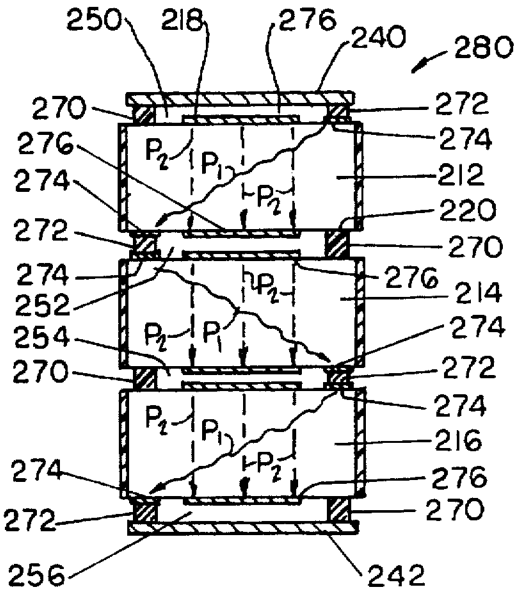

FIGS. 9 and 10 depict alternative embodiments of the inventive surge arrester shown in FIG. 3. For clarity, conventional arrester component such as the housing, upper and lower terminals, internal spacers and springs are not shown in FIGS. 9 and 10.

Referring to FIG. 9, arrester assembly 210 generally comprises a series combination of MOV disks 212, 214, 216, spark gaps 250, 252, 254 and 256, insulative spacers 234, 236 and conducting rings 238, 239. MOV disks 212, 214, 216 are identical to MOV's 20 previously shown and described with reference to FIGS. 1 and 3. Each MOV 212, 214, 216 include an upper face 218 and a lower face 220. MOV 212 and 216 each includes a peripheral upper contact surface 228, an upper central contact surface 230, a lower peripheral contact surface 226 and a lower central contact surface 224. MOV 214 includes an upper central contact surface 260, an upper peripheral contact surface 262, a lower central contact surface 264, and a lower peripheral contact surface 266. Contact surfaces 224, 226, 228 and 230 and contact surfaces 260, 262, 264 and 266 comprise metallic coatings produced, for example, by arc spraying. These contact surfaces are identical to surfaces 26, 28, 30 and 32 previously described with reference to FIGS. 1 and 3. As shown in FIG. 9, MOV disk 214 is identical in structure to MOV's 212, 216, but is stacked in series in an upside down relationship as compared to MOV's 212 and 216.

Arrester assembly 210 includes at its upper end a plate electrode 240. Electrode 240 is spaced apart from upper central contact surface 230 of MOV 212 by conductive ring 238 which creates a series electrical path between electrode 240 and upper peripheral contact surface 228. Spark gap 250 is thus formed between plate electrode 240 and upper central contact surface 230. MOV's 212 and 214 are spaced apart by insulative spacer ring 234 and contact 244 which comprises a relatively small cylindrical contact of conducting material such as brass, copper or aluminum. Contact 244 has a height equal to the thickness of insulative spacer ring 234 when ring 234 is compressed the desired, predetermined amount when assembled in a completed arrester. Insulative ring 234 is preferably made of silicone rubber, Buna N or neoprean. As shown, series spark gap 254 is formed between lower peripheral contact surface 226 of MOV 212 and upper peripheral contact surface 262 of MOV 214.

Conductive ring 239 is identical to ring 238 previously described and is disposed between MOV blocks 214 and 216 and electrically engages the adjacent peripheral contact surfaces 266 and 228. Spark gap 254 is thereby formed between lower central contact surface 264 of MOV 214 and upper central contact surface 230 of MOV 216.

The lower end of arrester assembly 210 includes plate electrode 242 which is identical in structure to plate electrode 240 previously described. Plate electrode 242 is spaced apart from lower face 220 of MOV 216 by contact 245 and insulative spacer ring 236 which are identical to contact 244 and spacer ring 234, respectively, described above. As shown, spark gap 256 is thereby formed between lower peripheral contact surface 226 of MOV 216 and plate electrode 242.

The multiple controlled current paths of this embodiment are denoted by arrows $P_1$ and $P_2$ as shown in FIG. 9. More specifically, steady-state current is conducted through MOV blocks 212, 214, 216 along the paths denoted by arrows $P_1$. As shown, the steady-state path is formed from the periphery of the upper face 218 to the central portion of the lower face 220 of MOV disks 212 and 216 and from the central portion of upper face 218 to the periphery of the lower face 220 of MOV disk 214. By contrast, to quickly dissipate transient surges, the current induced by transient overvoltages is conducted along the more direct path across gaps 250, 252, 254, 256 and through MOV's 212, 214, 216 along the multiple paths denoted by arrows $P_2$.

Referring now to FIG. 10, a further alternative embodiment of the present invention is shown. In FIG. 10, arrester subassembly 280 is shown to generally comprise MOV's 212, 214, 216, upper electrode 240 and lower electrode 242, all as previously described with reference to FIG. 9. In this arrangement, each MOV is separated from an adjacent MOV or adjacent electrode by insulative spacers 270 and conductive spacers 272. It is preferred that both spacers 270, 272 be formed of arcuate ring segments of equal height, although each may also be formed into a cylinder, cube or other easy-to-manufacture geometric shape. Insulators 270 are comprised of a soft polymer, such as Buna N or Neoprean, or other insulative material known to those skilled in the art. Conductive spacers 272 are preferably made of brass or aluminum, although other conductive materials may similarly be employed.

Formed on upper and lower faces 218, 220 of MOV's 212, 214, 216 are central contact surfaces 276 identical to upper contact surface 28 previously described with reference to FIGS. 1 and 3. Additionally, a contact surface 274 is formed on upper and lower faces 218, 220 of MOV's 212, 214, 216 adjacent to each conductive spacer 272 so as to create a series electrical path between conductive spacers 272 and the adjacent MOV disks.

In this embodiment, the steady-state current path, denoted by arrows $P_1$ in FIG. 10, passes through MOV disks 212, 214, 216 in a diagonal path from a location on the upper periphery of upper face 218 to an opposite location on lower face 220. In this embodiment, steady-state path denoted by arrow $P_1$ is longer than the steady-state paths $P_1$ shown in FIGS. 3 and 9, for example. Still, however, as with the other embodiments described, the current paths for surge current, denoted by arrows $P_2$, is more direct, allowing surge current to pass directly through arrester assembly 280 across gaps 250, 252, 254, 256 and between contact surfaces 276 in a path substantially parallel to the longitudinal axis of MOV's 212, 214, 216.

Figure 11:
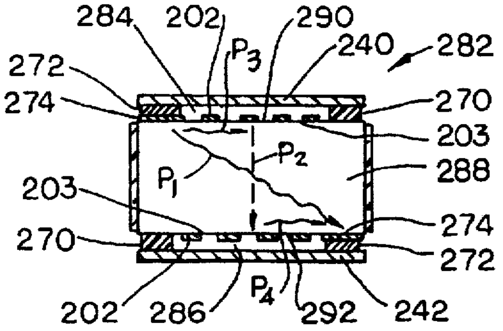
FIGS. 11 and 12 show cross-sectional views of alternative embodiments of the MOV disks of the arrester shown in FIG. 10.

Another alternative embodiment of the present invention is shown in FIG. 11. Referring to FIG. 11, an arrester subassembly 282 is shown. Subassembly 282 generally comprises MOV 288, plate electrodes 240, 242, as previously described with reference to FIG. 9, and spark gaps 284 and 286. MOV 288 includes upper face 290 and lower face 292 and is identical to MOV 20 previously described with reference to FIGS. 1 and 3. Electrodes 240 and 242 are spaced apart from upper face 290 and lower face 292, respectively, by insulative spacers 270 and conductive spacers 272 which have previously been described with reference to FIG. 10. Conductive spacer 272 creates a series electrical path between electrodes 240, 242 and contact surfaces 274, described above with reference to FIG. 10. Upper and lower faces 290, 292 include an array of spot contacts 202, previously described with reference to FIG. 8. Spot contacts 202 on the upper and lower faces of MOV 288 increase the resistance seen by steady-state current which might otherwise be propagated between electrodes 240 and 242 along a different, less resistive path, such as the path denoted by arrows $P_3$, $P_2$ and $P_4$, for example. The added surface resistance provided by the unmetalized portions 203 ensures that steady-state current flows through MOV 288 diagonally from the upper face 290 to the lower face 292 via the path denoted by arrow $P_1$ in FIG. 11. While increasing the surface resistance in steady-state current, spot contacts 202 also provide an improved conductive surface for surge current to flow through MOV 288 across gaps 284 and 286 in the paths that are substantially parallel to the longitudinal axis of MOV 288, as denoted by arrow $P_2$ in FIG. 11.

Applying spot contacts 202 about substantially the entire upper and lower faces 290, 292 of MOV 288 also serves to create a uniform current density for the surge current so that substantially the entire cross-sectional area of the MOV disk 288 may be employed to conduct the surge current and to dissipate the resultant energy as previously described with reference to FIGS. 6 and 7.

Figure 12:
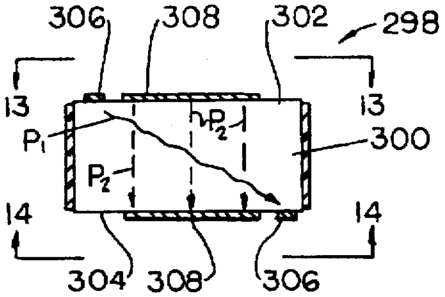
Figure 13:
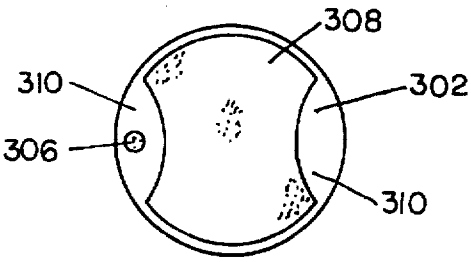
FIGS. 13 and 14 show top and bottom plan views, respectively, of the MOV disk shown in FIG. 12.
Figure 14:
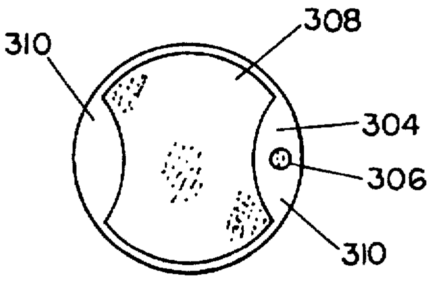

Referring to FIGS. 12 through 14, another alternative embodiment of the present invention is shown which includes arrester subassembly 298. As shown, subassembly 298 generally comprises MOV 300 having an upper face 302 and lower face 304. MOV 300 is substantially identical to MOV 20 previously described with reference to FIGS. 1 and 3. As best shown in FIGS. 13 and 14, in this embodiment, upper and lower faces 302, 304 each include contact surfaces 308 which cover substantially the entire face, with the exception of edge portions 310 which are left unmetalized. Upper and lower faces 302, 304 each include a contact surface 306 which is located within one of the unmetalized edge portions 310 such that upper and lower contacts 306 are positioned diagonally opposite one another on MOV 300.

The operation of subassembly 298 is best described with reference to FIG. 12. As shown, subassembly 298 conducts steady-state current diagonally through MOV 300 between contacts 306 along the path denoted by arrow $P_1$. Surge current is conducted through MOV 300 from upper face 302 to lower face 304 along the many parallel paths denoted by arrow $P_2$. As shown in FIG. 12, surge current passes directly through MOV 300 substantially parallel to the longitudinal axis of MOV 300. Contact surfaces 308 provide for better conduction of such surge current across the adjacent spark gaps (not shown) which, for example, may be formed by means of electrodes 240, 242 and spacers 270, 272 as shown in FIG. 11. Referring again to FIG. 12, unmetalized edge portion 310 increases the resistance to steady-state current being conducted between contacts 306 and contact surfaces 308 which might otherwise allow the steady-state current to be conducted directly through MOV 300 via path $P_2$. Thus, unmetalized portions 310 again ensure that the steady-state current is conducted along the longer, higher resistive path denoted by arrow $P_1$.

Figure 15:
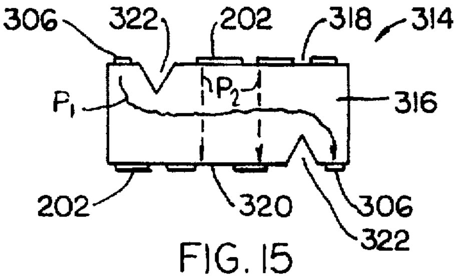
FIG. 15 shows a cross-sectional view of an alternative embodiment of the MOV disk shown in FIGS. 11 and 12.

FIG. 15 shows a further modification or alternative embodiment of the present invention which may be utilized to further lengthen the path $P_1$ for steady-state current. In this embodiment, subassembly 314 includes MOV 316 having an upper face 318 and a lower face 320. MOV 316 is substantially identical to MOV 20 previously described with reference to FIGS. 1 and 3. Upper and lower faces 318, 320 of MOV 316 include spot contacts 306 positioned diagonally opposite one another on faces 318 and 320 as described with reference to FIG. 12. Adjacent to spot contacts 306 are grooves or notches 322 which are formed into faces 318, 320 of MOV disk 316. Notches 322 provide an increased resistance to steady-state current flowing from contact 306 toward the center of MOV 316. Additionally, notches 322 further lengthen the steady-state current path $P_1$ as compared to the more direct diagonal path the steady-state current would take if notches 322 were not provided, such as the path denoted by arrows $P_1$ shown in FIG. 12.

FIGS. 16 through 23 show various embodiments of the present invention which include coaxial current paths through the MOV elements and arrester assemblies. More specifically, in these embodiments, the steady-state current flows through the MOV's and the arrester assemblies along the outer periphery of the MOV elements in a path that is parallel to the current path of the surge current. The current path for the surge current extends substantially through the entire cross-sectional area of the MOV disks and is parallel to the longitudinal axis of the MOV's.

Figure 16:
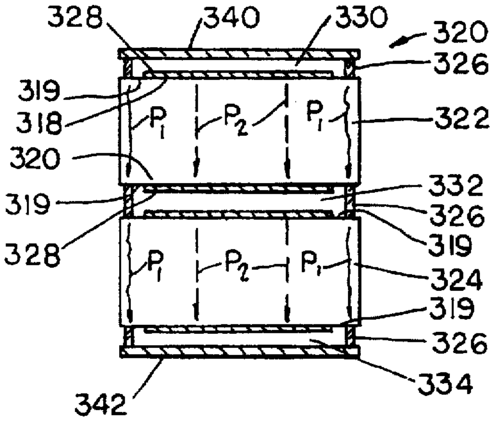
FIGS. 16–19 show cross-sectional views of further alternative embodiments of the surge arrester shown in FIG. 3.

Referring now to FIG. 16, there is shown arrester subassembly 320 which generally comprises MOV's 322, 324, upper and lower electrodes 340, 342 and conducting rings 326. MOV's 322, 324 each include upper and lower faces 318 and 320, respectively. MOV's 322, 324 are substantially identical to MOV 20 previously shown and described with reference to FIGS. 1 and 3. Conducting rings 326 are identical to rings 238, 239 previously described with reference to FIG. 9. Electrodes 340, 342 are identical to electrodes 240, 242, also previously described with reference to FIG. 9.

As shown in FIG. 16, MOV's 322 and 324 include a central metalized contact surface 328 on upper face 318 and on lower face 320. The peripheral portions 319 of upper face 318 and lower face 320 are not metalized. Conductive rings 326 are disposed on upper and lower faces 318 and 320 on unmetalized portions 319 and are used to separate the MOV blocks from adjacent MOV's and from electrodes 340 and 342. In this arrangement, a spark gap 330 is formed between electrode 340 and MOV 322. Similarly, spark gap 344 is formed between lower electrode 342 and MOV 324, and gap 332 is formed between the adjacent MOV's 322, 324. The steady-state and surge current paths through MOV's 322, 324 are represented by arrows $P_1$ and $P_2$, respectively.

Referring still to FIG. 16, in a steady-state or normal condition, the voltage present across arrester assembly 320 will not be great enough to cause the series spark gaps 330, 332, 334 to conduct. Accordingly, the steady-state current will flow through assembly 320 between electrodes 340 and 342 through conductive rings 326 and along the outer periphery of MOV's 322, 324 along the path denoted by arrow $P_1$. The unmetalized peripheral portions 319 of upper and lower faces 318 and 320 provide an increased resistance to current flowing through conductive rings 326 and along the path denoted by arrows $P_1$ than would be present if portion 319 included a metalized contact surface. Although the lengths of the steady-state current path $P_1$ and surge current path $P_2$ are substantially the same, the resistance to steady-state current through path $P_1$ is substantially greater than that through path $P_2$ due to additional resistance imposed in path $P_1$. The additional resistance imposed in path $P_1$ by unmetalized surface 319 controls or grades the adjacent parallel spark gap 330 and will determine at what voltage conduction will occur across the gap. Additionally, the unmetalized portion 319 also provides additional resistance to steady-state current which would tend to flow from conductive ring 326 toward the center of MOV's 322, 324 along the upper and lower faces 318, 320, thus ensuring that the steady-state current flows through MOV's 322, 324 along the path denoted by arrows $P_1$. When subassembly 320 is exposed to high transient voltages, spark gaps 330, 332, 334 will conduct and permit surge current to flow through assembly 320 along the path denoted by arrows $P_2$. Contact surfaces 328 provide a uniform surge current density and allow substantially the entire cross-sectional area of MOV disks 322, 324 to be used in dissipating the surge energy.

While the conductive standoffs between MOV's 322 and 324 and between the MOV's and adjacent electrodes 340, 342 have been shown and described as conductive rings 326, it will be understood by those skilled in the art that a variety of other conductive standoff means may be employed, such as a plurality of conductive cylinders, disks, cubes or the like.

Figure 17:
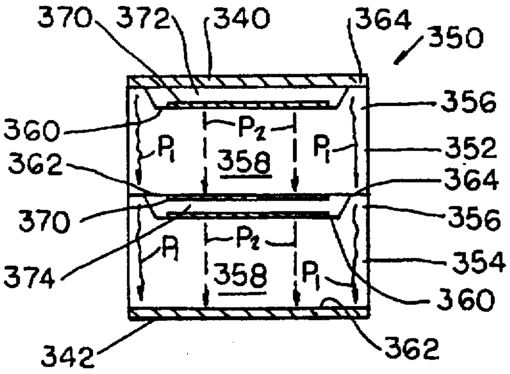

An alternative embodiment of an arrester subassembly having coaxial current paths is shown in FIG. 17. As shown in FIG. 17, arrester assembly 350 comprises a series of MOV's stacked in columnar fashion with upper and lower plate electrodes 340, 342 as previously described. Two MOV's 352, 354 are shown in FIG. 17, although as understood by those skilled in the art, several more MOV's may be employed in a given arrester, the total number being dependent upon the formulation of the metal oxide, the thickness of the MOV disks and the applied voltage level.

Each MOV 352, 354 generally comprises a cylindrical base portion 358 and a crown portion 356. Base portion 358 includes upper face 360 and lower face 362. Upper and lower faces 360, 362 include a central metalized contact surface 370 substantially identical to central contact surface 28 previously described with reference to FIGS. 1 and 3. Crown 356 is formed along the periphery of upper face 360. As shown in FIG. 17, lower plate electrode 342 supports MOV 354 and is in electrical contact with base portion 358. Crown 356 of MOV 354 supports MOV 352, thereby creating series spark gap 374 between upper face 360 of MOV 354 and lower face 362 of MOV 352. Similarly, crown 356 of MOV 352 supports upper plate electrode 340 such that series spark gap 372 is formed between electrode 340 and upper face 360 of MOV 352. Crowns 356 of MOV's 352 and 354 include an upper surface 364 which is preferably left unmetalized to increase the series resistance to current flow through crown 356 along the steady-state current path denoted by arrows $P_1$. The surge current path is denoted by arrows $P_2$.

In this embodiment, crown portions 356 formed on MOV's 352, 354 perform the same function as combination of conductive rings 326 and unmetalized portions 319 previously described with reference to FIG. 16. More specifically, crown 356 provides an additional resistance to current flow in path $P_1$, physically defines the dimensions of gaps 372 and 374, and resistively grades or controls the spark-over of gaps 372 and 374. As shown in FIG. 17, the steady-state current path is thus formed along the outer periphery of MOV's 352, 354, while surge-induced current is conducted through the central portion of the MOV's 352, 354 and across gaps 372, 374 along the path denoted by arrows $P_2$.

Figure 18:
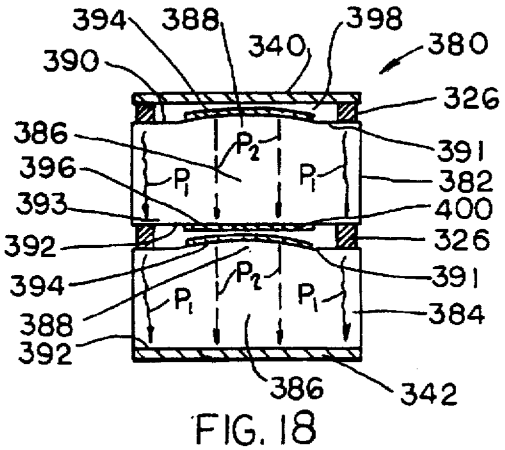

FIG. 18 shows another alternative embodiment of a multiple current path arrester of the present invention. Referring to FIG. 18, arrester assembly 380 comprises a column of MOV elements 382, 384 stacked in series relationship along with plate electrodes 340, 342 and conductive rings 326, electrodes 340, 342 and rings 326 being previously described with reference to FIG. 16. MOV 382 and 384 include a cylindrical base portion 386 having upper face 390 and lower face 392. Formed atop upper face 390 of MOV's 382, 384 is dome 388 preferably made from the same metal oxide formulation as used for base portion 386. Dome 388 includes metalized contact surface 394, leaving an unmetalized peripheral portion 391 on upper face 390. Lower face 392 of MOV 382 and 384 includes a central metalized contact surface 396 and an unmetalized peripheral portion 393. Metalized contact surfaces 394 and 396 are substantially identical to contact surface 28 previously described with reference to FIGS. 1 and 3. With the exception of the addition of dome 388 on its upper face, MOV's 382, 384 are substantially identical to MOV 20, likewise described previously with reference to FIGS. 1 and 3.

As shown in FIG. 18, lower electrode 342 supports and is in electrical contact with lower face 392 of MOV 384. Conductive ring 326 is disposed between MOV 384 and 382 along the opposing unmetalized peripheral portions 391 and 393. An identical conductive ring 326 is disposed between MOV 382 and upper electrode 340. In this arrangement, a series gap 398 is formed between electrode 340 and dome 388 of MOV 382. Likewise, spark gap 400 is formed between lower central contact surface 396 of MOV 382 and contact surface 394 of MOV 384. By varying the height of dome 388 and the thickness or height of conductive ring 326, the width of gaps 398 and 400 may be controlled.

Because there is no metalized contact surface between insulative ring 326 and base portions 386 of MOV's 382, 384, a high resistance path is created for the steady-state current which flows along the path denoted by arrows $P_1$. When a transient condition exists having a magnitude great enough to cause the arrester to operate, series gaps 398 and 400 will begin to conduct, permitting the resulting surge current to flow through arrester assembly 380 across spark gaps 398, 400 and through MOV's 382, 384 along the path denoted by arrows $P_2$.

Figure 19:
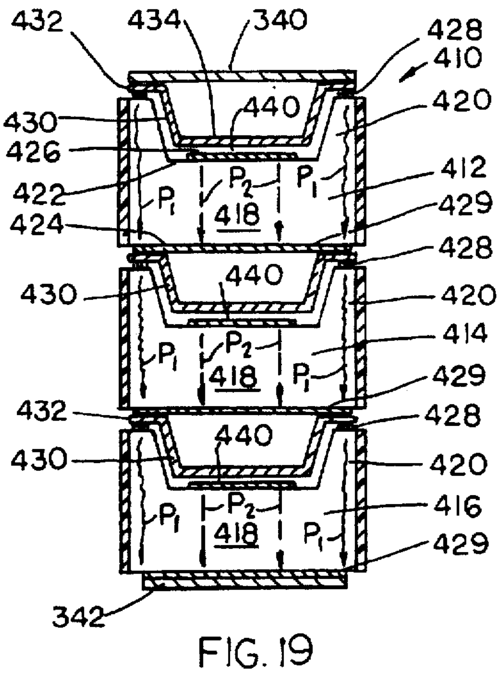

FIG. 19 shows another alternative embodiment of an arrester of the present invention having coaxial current paths. Referring to FIG. 19, there is shown arrester assembly 410 which generally includes MOV's 412, 414, 416 stacked in columnar fashion with electrodes 430, 340 and 342. Each MOV 412, 414, 416 comprises a generally cylindrical base portion 418 and a crown portion 420. Base 418 includes upper face 422 and lower face 424. Crown 420 is formed on the periphery of upper face 422 of MOV's 412, 414, 416. Upper face 422 of each MOV includes a metalized central contact surface 426. Similarly, the upper surface of crown 420 of each MOV is metalized at 428 and lower face 424 of each MOV includes a metalized contact surface 429.

Electrode 430 is preferably deep drawn of brass but may be manufactured by other means and may comprise copper, aluminum or other conductive material. Electrode 430 generally comprises rim 432 and a set off central portion 434.

The metalized surface 428 of each MOV crown 420 is in electrical contact with rim 432 of electrode 430. Rim 432 of the uppermost electrode 430 also supports upper plate electrode 340 creating a series current path therethrough. Lower plate electrode 342 is in electrical contact with contact surface 429 of lower face 424 of MOV 416. In this configuration, a spark gap 440 is formed between central portion 434 of each electrode 430 and the contact surface 426 of the adjacent upper face 422 of MOV's 412, 414, 416.

In this embodiment of FIG. 19, the steady-state current path is denoted by arrows $P_1$, the steady-state current generally flowing through assembly 410 along the outer periphery of MOV's 412, 414, 416 through rims 432 of electrodes 430. The height of crowns 420 provides for a longer and thus more resistive path for the steady-state current $P_1$ as compared to the path for the surge-induced current, denoted by arrows $P_2$, and also provides the grading resistance for controlling the sparkover of gaps 440. When a transient of sufficient magnitude occurs, spark gaps 440 will begin to conduct such that impulse current is conducted across gaps 440 and through MOV's 412, 414, 416 along the path denoted by arrows $P_2$. When the impulse current reaches the lower face 424 of MOV's 412, 414, 416, it is conducted to the peripheral portion of face 424 by metalized contact surface 429 which provides for good electrical contact with electrode 430. In this manner, electrode 430 becomes energized and the spark gap 440 that is formed between the now-energized electrode 430 and the next adjacent MOV will begin to conduct.

Figure 20:
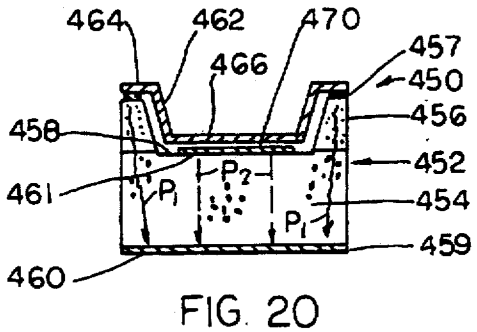
FIGS. 20–22 show, in cross-section, alternative embodiments of the MOV element employed in the arresters shown in FIG. 19.

Another alternative embodiment of the present invention is shown in FIG. 20. Referring to FIG. 20, there is shown an arrester subassembly 450 which generally comprises MOV 452 and electrode 462. Electrode 462 is identical to electrode 430 described above with reference to FIG. 19. MOV 452 comprises cylindrical base portion 454 and a crown portion 456. Base 454 includes upper face 458 and lower face 460. Crown 456 is formed on the periphery of upper face 458 of base portion 454. In this embodiment, crown 456 is formed of a metal oxide that is different from the metal oxide used to form base portion 454. More specifically, crown portion 456 is preferably formed of a modified formulation of zinc oxide material having an exponent n within the range of approximately 5 to 10, and preferably 10, at the steady state system voltage. By contrast, base portion 454 comprises a metal oxide formulation having an exponent n within the range of about 10–25, and preferably about 20, at the steady state voltage. The resistance of crown 456 is used to control the voltage at which gap 470 becomes conductive.

Crown 456 includes an upper metalized face 457 which supports and electrically engages rim 464 of electrode 462. Lower face 460 includes a metalized contact surface 459 for engaging an adjacent electrode 462 which would be provided when assembly 450 was stacked in series with addition such subassemblies 450 in an arrester housing. Upper face 458 includes a central contact surface 461. As shown in FIG. 20, spark gap 470 is formed between central portion 466 of electrode 462 and contact surface 461 of MOV 452. Steady-state current is conducted along the path denoted by arrows $P_1$. During surge conditions, gap 470 will conduct such that surge current is conducted through MOV 452 along the path denoted by arrows $P_2$.

Figure 21:
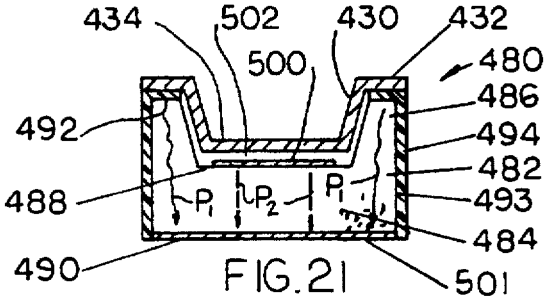

FIG. 21 shows another alternative embodiment of the present invention including an MOV arrester subassembly 480 having coaxial, multiple current paths. Referring to FIG. 21, arrester subassembly 480 generally comprises MOV 482, electrode 430 (previously described with reference to FIG. 19) and semiconductor coating 494. As shown, MOV 482 includes a generally cylindrical base portion 484. Base portion 484 includes upper face 488 and lower face 490. Upper face 488 includes a central metalized contact surface 500. Lower face 490 of MOV 482 is metalized about its entire cross-sectional area forming contact surface 501. MOV 482 further includes a crown portion 486 formed on the periphery of upper face 488 of base 484. In this embodiment, crown portion 486 and base 484 are formed of the same metal oxides having n equal to approximately 20 at the steady-state system voltage. A semiconductive coating 494 made of zinc oxide or similar material is disposed about the outer surface 493 of MOV 482 and on top face 492 of crown 486. Rim 432 of electrode 430 is supported by and in electrical contact with semiconductive coating 494 atop crown 486. As shown in FIG. 21, series spark gap 502 is formed between central portion 434 of electrode 430 and upper face 488 of MOV base 484.

In this embodiment, the semiconductive coating 494 disposed between crown 486 and electrode 430 provides added resistance in the path for steady-state current denoted by arrows $P_1$. The added resistance provided by semiconductor 494 and the resistance of crown portion 486 combine to provide resistive grading of gap 502. Surge current will be conducted across gap 502 and through MOV disk 482 along the path denoted by arrows $P_2$ when gap 502 is caused to conduct by a transient overvoltage of magnitude equal to or greater than a predetermined magnitude.

Figure 22:
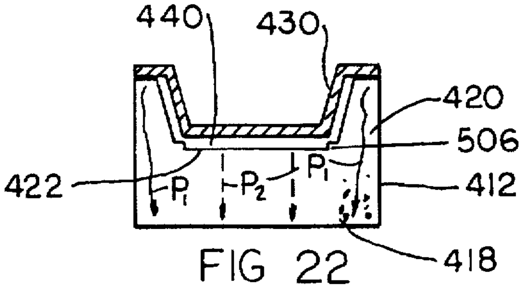

Referring briefly to FIG. 22, there is shown a modification which may be made to the MOV's previously described with reference to FIGS. 19–21. For purposes of example only, the modification will be described with reference to MOV disk 412 shown in FIG. 19. Referring to FIG. 22, MOV 412 is shown including base portion 418 and crown 420. In this embodiment, MOV 412 further includes a knee 506 formed at the junction of crown 420 and upper face 422 of base 418. Knee 506 comprises an ion generator understood by those skilled in the art as useful for sparkover stabilization.

Figure 23:
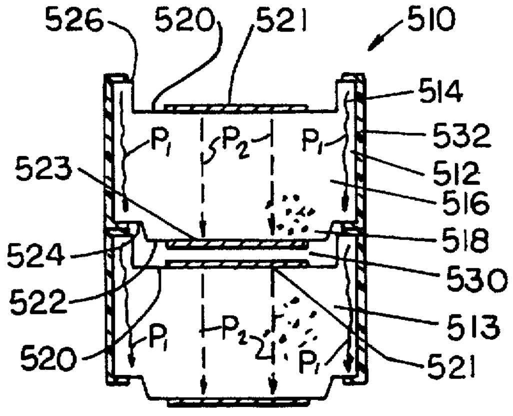
FIG. 23 shows a cross-sectional view of another alternative embodiment of the surge arrester shown in FIG. 3.

FIG. 23 shows another embodiment of an arrester assembly including coaxial current paths which is a part of the present invention. Referring to FIG. 23, an arrester subassembly 510 is shown comprising MOV's 512, 513 stacked in columnar fashion. Each MOV 512, 513 generally comprises a cylindrical central portion 516, crown 514 and lower extension 518. In this embodiment, it is contemplated that crown 514, central portion 516 and lower extension 518 would all be comprised of the same metal oxide material such as a zinc oxide having an exponent n equal to 20; however, for added resistance in the steady-state current path denoted by arrows $P_1$, crown 514 may be comprised of a more resistive metal oxide than that used to form portions 516 and 518. Central portion 516 of MOV's 512, 513 include an upper face 520 having a central contact surface 521. Similarly, lower extension 518 includes a central metalized contact surface 523.

Semiconductor coating 532 is applied around the outer surface of MOV's 512, 513 and on upper face 526 of crown 514. Additionally, semiconductive material 532 is also applied on lower face 524 of central portion 516. As shown in FIG. 23, a series gap 530 is formed between contact surface 523 of MOV 512 and contact surface 521 of MOV 513.

The adjacent and contacting surfaces of semiconductor 532 between MOV's 512 and 513 provides additional resistance in the steady-state current path denoted by arrows $P_1$ and grades gap 530. As shown, steady-state current generally flows along the periphery of MOV's 512 and 513. When assembly 512 experiences a transient sufficient to cause series gap 530 to conduct, surge current flows through the central portion of MOV's 512, 513 and across gap 530 along the path denoted by arrows $P_2$.

Figure 24:
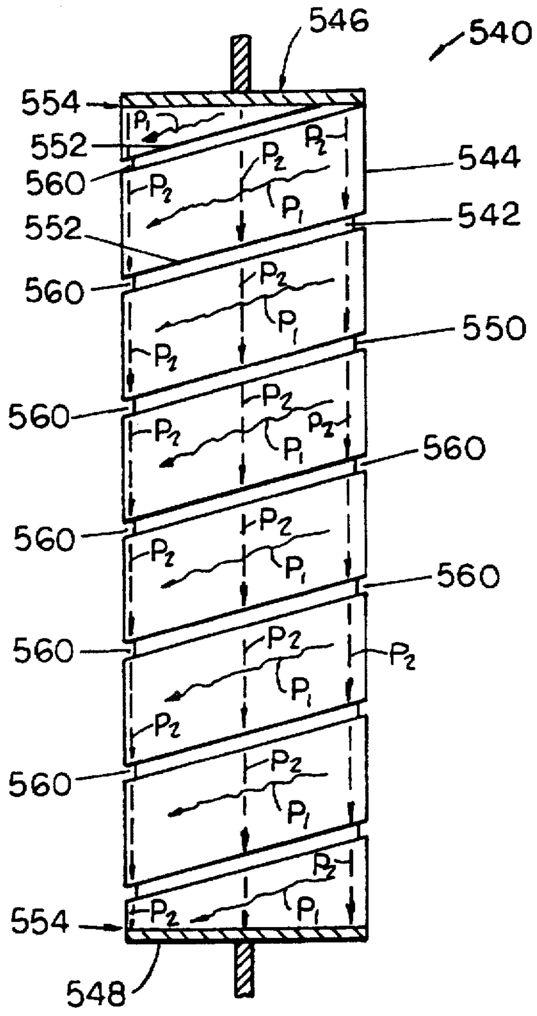
FIG. 24 shows a front elevation view of still a further alternative embodiment of the surge arrester shown in FIG. 3.

FIG. 24 shows still another alternative embodiment of the present invention. Referring to FIG. 24, there is shown an arrester assembly 540 generally comprising substrate 542, MOV material 544, upper electrode 546 and lower electrode 548. Substrate 542 generally comprises a cylindrical insulator made of porcelain or other insulative material. MOV material 544 is disposed about the outer surface 550 of substrate 542 and preferably has a thickness of approximately 0.015–0.05 inches. MOV material 544 is formulated to have an exponent n within the range of approximately 10–25, and preferably about 20, at the system's steady-state voltage. As shown, a channel 552 is formed in spiral fashion through MOV material 544 along the entire length of assembly 540. This channel 552 has a depth substantially equal to the thickness of MOV material 544. In the preferred embodiment, arrester assembly 540 is manufactured with MOV material 544 completely covering substrate 550 and with channel 552 thereafter being formed through the MOV material 544. Alternatively, MOV material 544 may be applied to substrate 550 in a ribbon-like fashion, the voids between the adjacent edges of MOV material 544 thereby defining channel 552. Using either method of manufacture, series gaps 560 are formed across channel 552 between the adjacent segments of MOV material 544. Upper and lower electrodes 546 and 548, respectively, are disposed at the ends of substrate 550 in electrical contact with the edges of MOV material 544 as shown at edge 554.

In the steady-state condition, the current flowing through arrester assembly 540 is conducted through electrode 546 into MOV material 544 at edge 554. The steady-state current thereafter is conducted through the MOV material 544 to lower electrode 548 in a long spiral path as denoted by arrows $P_1$. When arrester assembly 540 experiences an overvoltage condition of sufficient magnitude, series spark gaps 560 will become conductive such that the surge current is conducted through arrester assembly 540 through MOV material 544 in a direction substantially parallel to the longitudinal axis of arrester assembly 540 along the path denoted by arrows $P_2$.

While the preferred embodiments of this invention have been shown and described, modifications thereof can be made by one skilled in the art without departing from the spirit of the invention. The embodiments described herein are exemplary only and are not limiting. Many variations and modifications of the system and apparatus are possible and are within the scope of the invention. Accordingly, the scope of protection is not limited by the above description, but is only limited by the claims which follow, that scope including all equivalents of the subject matter of the claims.

We claim:

1. A surge arrester comprising:

a resistive element having a longitudinal axis and a helical steady-state current path for conducting steady-state currents through said element to ground and having an impulse current path substantially parallel to said axis for conducting surge currents through said element to ground; wherein said resistive element comprises a spiral of nonlinear resistive material formed about an insulative core and including a spark gap between adjacent segments of said spiral, wherein said steady state current path is through said nonlinear resistive material and does not include said spark gap.

2. A surge arrester comprising:

a resistive element having a central axis and a first face and a second face that is axially spaced apart from said first face by the thickness of said resistive element, each of said faces having a central region and a peripheral region surrounding said central region;

a first electrode in electrical contact with said peripheral region of said first face, said first electrode having a central portion that is axially spaced apart from said central region of said first face along an axis parallel to said central axis to form a first spark gap between said first electrode and said central region of said first face; and a second electrode in electrical contact with said central region of said second face, said second electrode having a peripheral portion axially spaced apart from said peripheral region of said second face along an axis parallel to said central axis to form a second spark gap between said second electrode and said peripheral region of said second face between said second electrode and said peripheral region of said second face;

such that said central axis passes through said central portion of said first electrode, said first spark gap, said central region of said first face, said resistive element and said central region of said second face.

3. The apparatus of claim 2 wherein said resistive element comprises a metal oxide varistor having an annular contact surface formed on said peripheral region of said first face in electrical contact with said first electrode; and a central contact surface formed on said central region of said second face in electrical contact with said second electrode.

4. The apparatus of claim 3 further comprising:

a contact surface on said central region of said first face that is spaced apart from said annular contact surface on said first face and an annular contact surface formed on said peripheral region of said second face that is spaced apart from said central contact surface on said second face.

5. A surge arrester, comprising:

a plurality of nonlinear varistors stacked in columnar relationship and forming a varistor stack, each of said varistors including an upper and lower face and a central region and a peripheral region surrounding said central region on said faces;

a plurality of series spark gaps each disposed between said central regions of adjacent varistors in said stack; and means for electrically connecting in series said peripheral regions of said varistors.

6. The apparatus of claim 5 wherein said connecting means comprises a conductive ring disposed between said peripheral regions of said varistors.

7. The apparatus of claim 5 wherein at least one of said varistors comprises a base portion and a crown portion formed on said peripheral region of at least one of said faces, and wherein said connecting means comprises said crown.

8. The apparatus of claim 7 further including an electrode disposed between said varistors.

9. The apparatus of claim 8 wherein said electrode includes a rim and an offset central portion connected to said rim, one of said series spark gaps being formed between said offset portion and said central region.

10. The apparatus of claim 7 further comprising an ion generator formed at the intersection of said crown and said base.

11. The apparatus of claim 5 wherein at least one of said varistors comprises a cylindrical body portion and a central extension formed on said body portion, one of said spark gaps comprising the space between said extension and said central region of an adjacent varistor.

12. A surge arrester comprising:

an elongate insulative core;

nonlinear resistive material disposed about said core;

a spiraling channel formed in said resistive material; and terminal means in electrical contact within said resistive material at each end of said core.

13. A surge arrester, comprising:

an insulative substrate;

a plurality of adjacent segments of MOV material disposed about said substrate and electrically connected in series during steady state operation of the arrester; and a plurality of spark gaps between said adjacent segments of MOV material.

14. The apparatus of claim 13 wherein said electrically connected segments of MOV material comprises a continuous ribbon of material disposed in a spiral fashion about said substrate so as to form a spiraling channel between said adjacent segments of said ribbon, said spiraling channel comprising said spark gaps.

15. A surge arrester, comprising:

an insulative substrate;

a plurality of adjacent segments of MOV material disposed about said substrate and electrically connected in series so as to form a steady state conduction path that is free of spark gaps; and a plurality of spark gaps between said adjacent segments of MOV material so as to form an impulse current path that includes said spark gaps.

* * * * *